US011919682B1

(12) United States Patent
Stem

(10) Patent No.: US 11,919,682 B1
(45) Date of Patent: Mar. 5, 2024

(54) POURING DEVICE FOR PAINT

(71) Applicant: George Stem, Jonesboro, AR (US)

(72) Inventor: George Stem, Jonesboro, AR (US)

( * ) Notice: Subject to any disclaimer, the term of this patent is extended or adjusted under 35 U.S.C. 154(b) by 0 days.

(21) Appl. No.: 18/208,333

(22) Filed: Jun. 12, 2023

(51) Int. Cl.
*B65D 47/20* (2006.01)
*B44D 3/12* (2006.01)
*B44D 3/14* (2006.01)
*B65D 25/48* (2006.01)

(52) U.S. Cl.
CPC ............. *B65D 47/20* (2013.01); *B44D 3/126* (2013.01); *B44D 3/127* (2013.01); *B44D 3/14* (2013.01); *B65D 25/48* (2013.01)

(58) Field of Classification Search
CPC .......... B44D 3/126; B44D 3/14; B65D 25/48; B65D 27/20; B62B 3/10; B62B 3/02
See application file for complete search history.

(56) References Cited

U.S. PATENT DOCUMENTS 3,672,547 A 6/1972 Kozlowski
4,993,726 A * 2/1991 Schumacher ............ B44D 3/14 280/47.35
D324,722 S 3/1992 Nordeen
5,460,391 A * 10/1995 Gantz ...................... B25H 3/06 108/14
5,533,802 A 7/1996 Garganese
5,855,304 A 1/1999 Dean et al.
6,164,212 A * 12/2000 Haggard ................ A47B 43/00 108/115
8,434,649 B2 5/2013 Gouverneur et al.
9,527,634 B2 * 12/2016 Stryker .................. B44D 3/127
10,039,369 B2 8/2018 Haemerle
10,661,951 B1 5/2020 Montes
2003/0006156 A1 * 1/2003 McCracken ........... B44D 3/128 206/562
2006/0066064 A1 * 3/2006 Hardy ...................... B44D 3/14 280/79.2
2009/0302563 A1 * 12/2009 Thibault ................. B62B 3/104 280/727
2019/0023062 A1 * 1/2019 Hamilton ................. B44D 3/12
2021/0008923 A1 * 1/2021 Robertson .............. B44D 3/125
2022/0363301 A1 * 11/2022 Sholeen ................... B44D 3/04

FOREIGN PATENT DOCUMENTS

CA 2607773 A1 * 4/2009 ............... B44C 7/06

* cited by examiner

*Primary Examiner* — Timothy P. Kelly
(74) *Attorney, Agent, or Firm* — Cramer Patent & Design PLLC; Aaron R. Cramer

(57) ABSTRACT

The easy pour may comprise a paint tray cart, a paint tray, and a paint conduit. The easy pour may be a caddy that is configured to move one or more paint containers and the paint tray within a jobsite. The paint tray may detachably couple to the paint tray cart. The paint tray cart may be operable to dispense a first paint into the paint tray from a first paint container via the paint conduit such that the first paint is resupplied to the paint tray as the first paint is used. The paint tray cart may be operable to support a second paint container holding a second paint in an upright position. As non-limiting examples, the first paint container may supply a wall paint as the first paint and the second paint container may supply a trim paint as the second paint.

3 Claims, 4 Drawing Sheets

POURING DEVICE FOR PAINT

RELATED APPLICATIONS

None.

FIELD OF THE INVENTION

The present invention pertains generally to a pouring device and more specifically to a pouring device for liquid paint.

BACKGROUND OF THE INVENTION

If you ask any experienced painter, they will tell you that the most frustrating part of their job is having to stop doing what they are most skilled at, which is applying the product, in order to perform the necessary task of keeping their roller pan full of paint, as well as dragging their pan around the construction site in order to keep up with their progress. If you ask any amateur painter, they will tell you that the worst part of their job is having to clean up after themselves.

The way that is now being employed necessitates that they either regularly undertake this duty themselves or pay a full-time assistant to do it for them. The expense of employing this laborer can be avoided by using the pouring device for paint, which results in increased income for the painter. It is not uncommon for full paint containers to weigh up to sixty pounds; therefore, painters who spend their days lifting and pouring paint, as well as bending to pick up the roller pan and move on to the next spot, lose vital energy that they should be using to focus on their chosen art form, which is painting. The use of the pouring device for paint addresses the aforementioned issues in a manner that is both cost effective and efficient.

SUMMARY OF THE INVENTION

Embodiments of the present disclosure may include an easy pour device, including a paint tray cart having a frame, a plurality of wheels, a paint tray holder, a first container holder, and a second container holder, the paint tray cart may be adapted to provide a caddy for a first paint container and a second paint container. Embodiments may also include a paint tray adapted to move the first paint container and the second paint container and the paint tray within a jobsite, the paint tray detachably couples to the paint tray cart.

In some embodiments, the paint tray cart may be operable to support the second paint container holding a second paint in an upright position. In some embodiments, the second paint container may be a 1-gallon paint container supplying a trim paint as the second paint. In some embodiments, the frame may be rectangular with an individual wheel selected from the plurality of wheels coupled to the bottom of each corner of the frame.

In some embodiments, the plurality of wheels includes at least two swivel wheels. In some embodiments, the frame includes a paint container platform such that a rear portion of the frame may be elevated above the front portion of the frame. In some embodiments, the paint tray holder includes a plurality of side rails coupled to the sides of the frame and at least one paint tray shelf coupled to the front of the paint container platform to support the paint tray from beneath.

In some embodiments, the paint tray holder may be a depression within a front of the paint tray cart that may be configured to support the paint tray. In some embodiments, the front of the paint tray cart includes a roller handle guide.

In some embodiments, the roller handle guide includes a plurality of upward projections on the front of the frame which may be adapted to prevent a handle of a paint roller or a brush from sliding laterally.

In some embodiments, the shape and size of the paint tray holder matches a footprint of the paint tray such that the paint tray may be lowered into the paint tray holder and may be detachably coupled to the paint tray holder. In some embodiments, the easy pour device, according to may include a front rail of the frame prevents the paint tray from sliding forward.

In some embodiments, the sides of the frame and/or the plurality of side rails prevent the paint tray from sliding to either side. In some embodiments, the first container holder may be configured to hold the first paint container in a pouring position where the first paint container may be tilted onto a side of the first paint container. Embodiments may also include in the pouring position, the first paint may flow into the paint tray through the paint conduit that may be coupled to the first paint container.

In some embodiments, the first paint flows until the first paint in the paint tray rises to the level of the bottom of the paint conduit, at which time the flow of the first paint cease. In some embodiments, the first container holder includes one or more paint container cradles and a paint container stop. In some embodiments, the paint tray cart may be operable to dispense a first paint into the paint tray from the first paint container such that the first paint may be resupplied to the paint tray as the first paint may be used. In some embodiments, the first paint may be dispensed from the first paint container to the paint tray via the paint conduit. In some embodiments, the first paint container may be a 5-gallon paint container supplying a wall paint as the first paint.

BRIEF DESCRIPTION OF THE DRAWINGS

The advantages and features of the present invention will become better understood with reference to the following more detailed description and claims taken in conjunction with the accompanying drawings, in which like elements are identified with like symbols, and in which:

DESCRIPTIVE KEY

Figure 1:
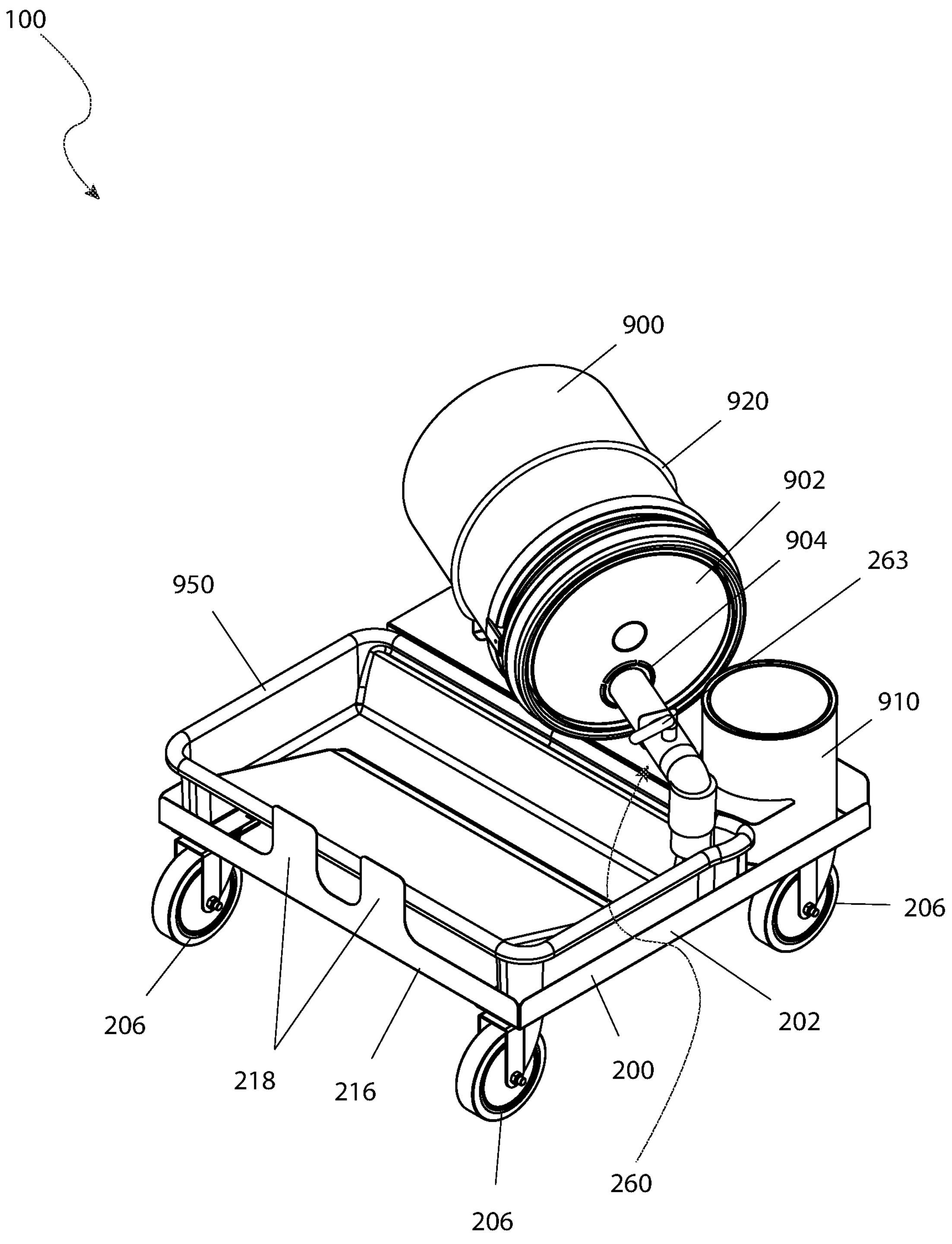
FIG. 1 is a front isometric view of an easy pour device, according to an embodiment of the present invention.

100 easy pour device
200 paint tray cart
202 frame
204 paint container platform
206 wheel
210 paint tray holder
212 side rail
214 paint tray shelf
216 front rail
218 roller handle guide 230 first container holder
232 first paint container cradle
233 first aperture
234 second paint container cradle
235 second aperture
236 paint container stop
240 second container holder
242 second container holder aperture
260 paint conduit
262 extension tube
263 valve
264 elbow
266 down tube
290 pouring position
292 upright position
900 first paint container
902 commercial paint container lid
904 commercial lid aperture
910 second paint container
920 strap
950 paint tray
952 side wall
954 inclined surface
956 bottom wall
970 lid
972 lid aperture
980 first included paint container
982 second included paint container

DESCRIPTION OF THE INVENTION

Figure 2:
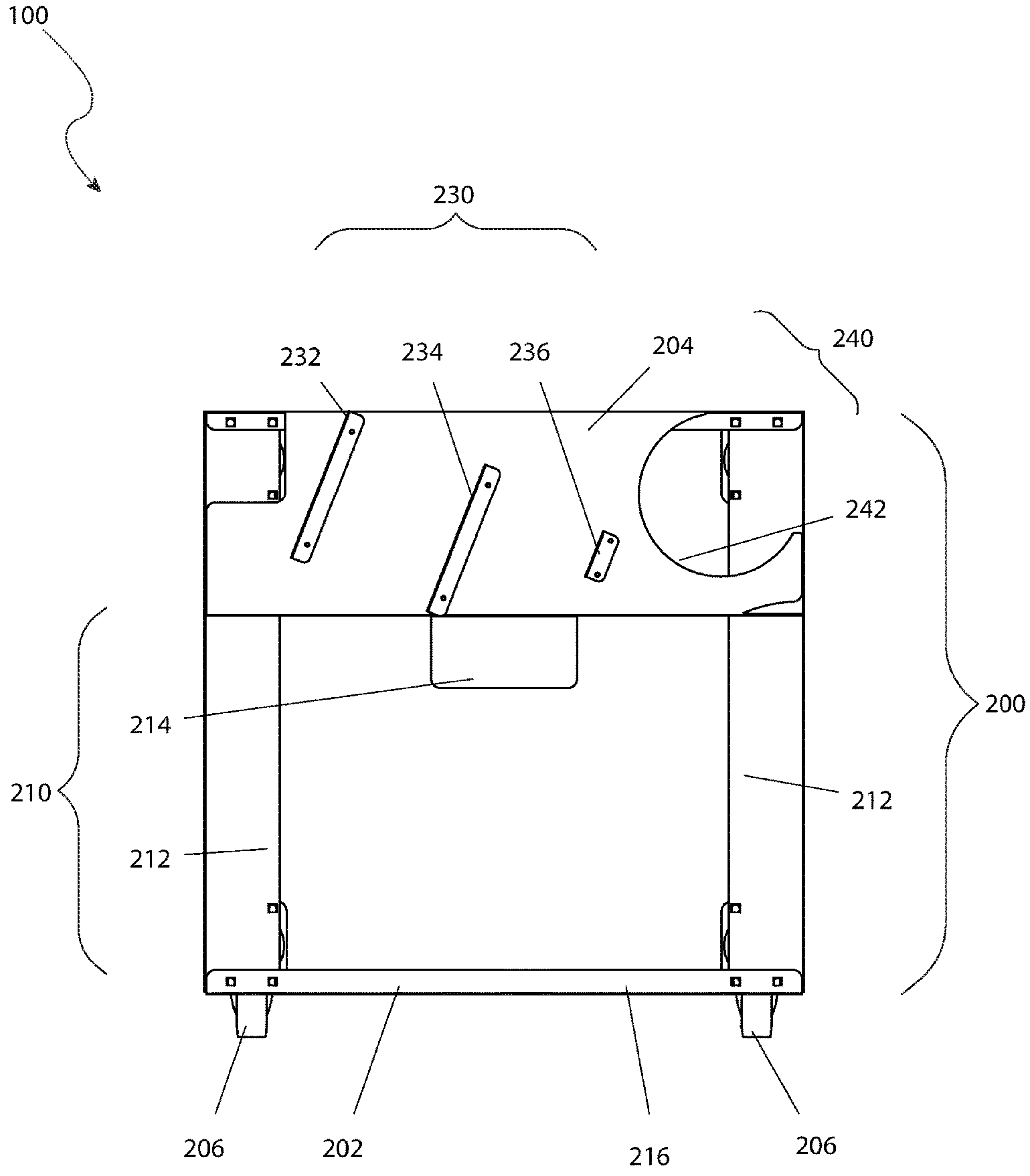
FIG. 2 is a top view of an easy pour device, according to an embodiment of the present invention.
Figure 3:
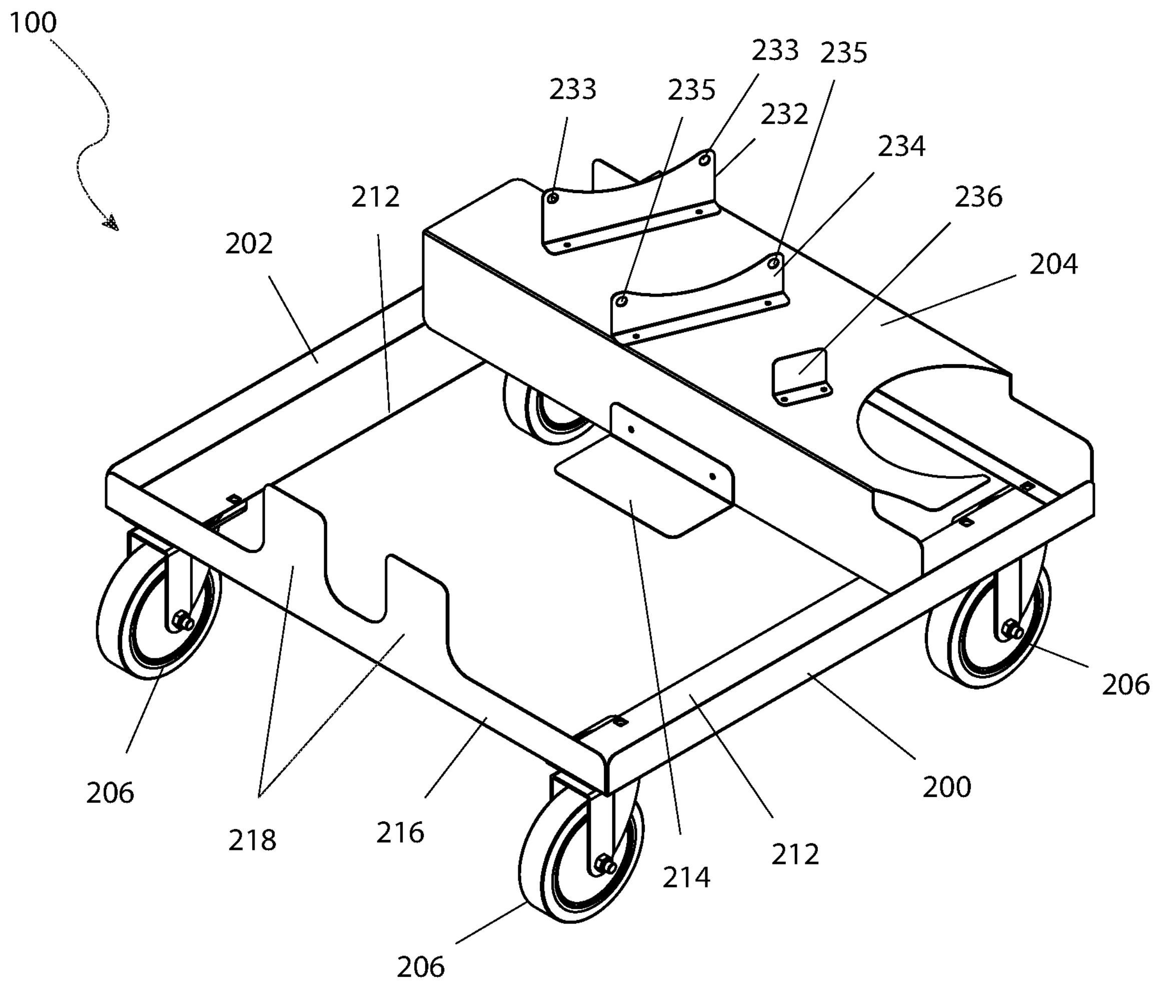
FIG. 3 is an isometric detail view of an easy pour device, according to an embodiment of the present invention, illustrating the paint cart tray.
Figure 4:
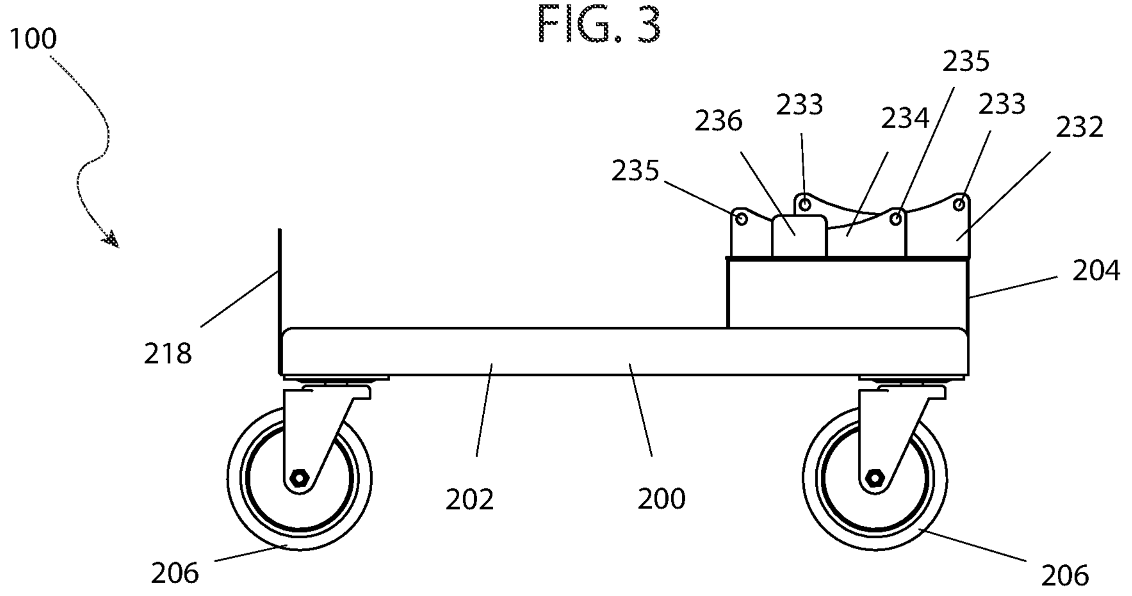
FIG. 4 is a side detail view of an easy pour device, according to an embodiment of the present invention, illustrating the paint cart tray.
Figure 5:
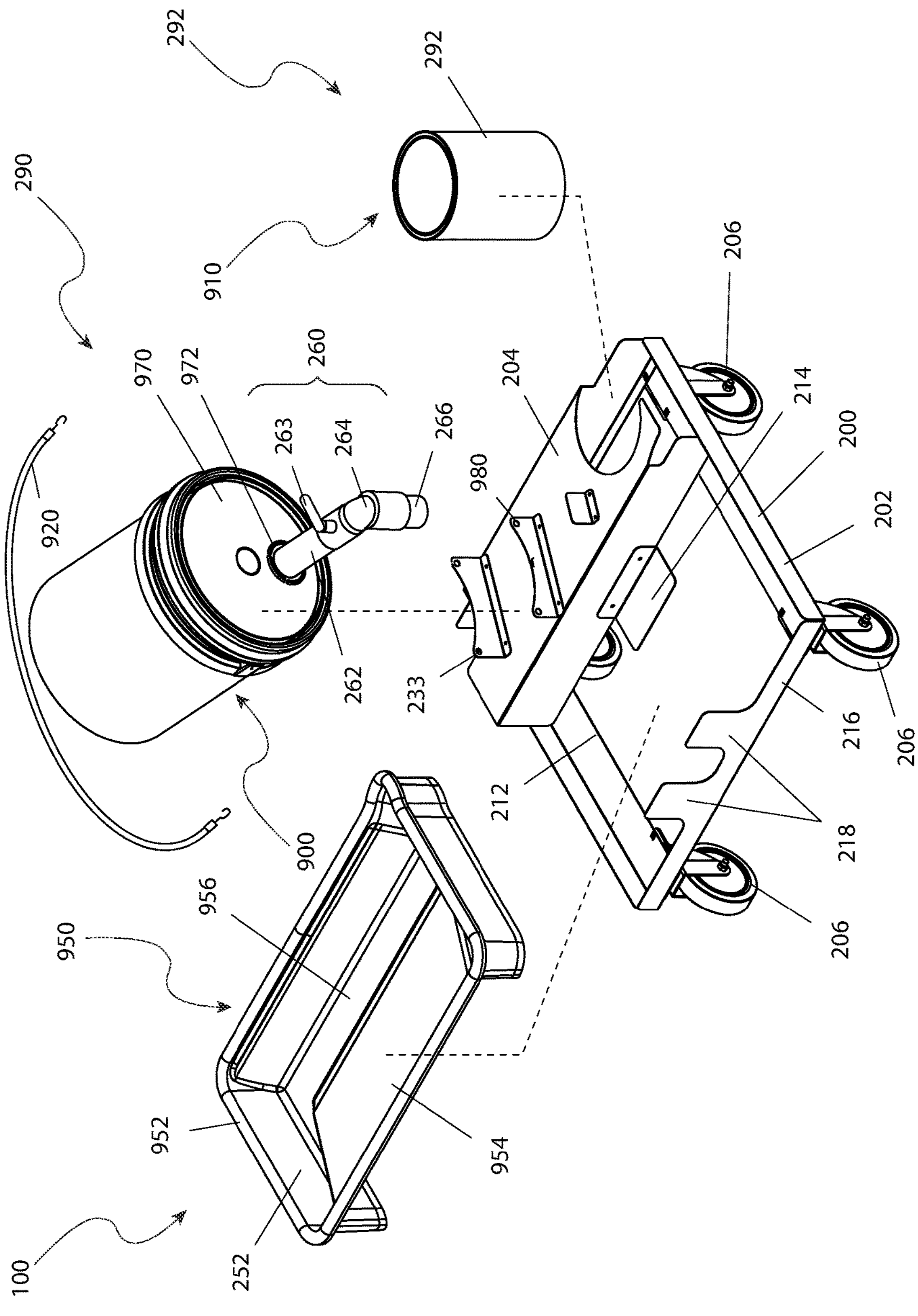
FIG. 5 is an exploded view of an easy pour device, according to an embodiment of the present invention.

The present invention is directed to an easy pour device (herein described as the "invention") 100 as disclosed in FIGS. 1-5. The invention 100 may comprise a paint tray cart 200 capable of providing a caddy for at least one (1) paint container 900, 910 and a paint tray 950 and configured to move the paint containers 900, 910 and the paint tray 250 within a jobsite. The paint tray 950 may detachably couple to the paint tray cart 200. The paint tray cart 200 may be operable to dispense a first paint into the paint tray 950 from a first paint container 900 such that the first paint is resupplied to the paint tray 950 as the first paint is used. The first paint may be dispensed from the first paint container 900 to the paint tray 950 via the paint conduit 260. The paint tray cart 200 may be operable to support a second paint container 910 holding a second paint in an upright position 292. As non-limiting examples, the first paint container 900 may be a 5-gallon paint container supplying a wall paint as the first paint and the second paint container 910 may be a 1-gallon paint container supplying a trim paint as the second paint.

The paint tray cart 200 may comprise a frame 202, a plurality of wheels 206, a paint tray holder 210, a first container holder 230, and a second container holder 240. The frame 202 may be rectangular with an individual wheel selected from the plurality of wheels 206 coupled to the bottom of each corner of the frame 202. The frame 202 may comprise a paint container platform 204 such that the rear portion of the frame 202 is elevated above the front portion of the frame 202. In some embodiments, the plurality of wheels 206 may comprise at least two (2) swivel wheels.

The paint tray holder 210 may be a depression within the front of the paint tray cart 200 that is configured to support the paint tray 950. The shape and size of the paint tray holder 210 may match the footprint of the paint tray 950 such that the paint tray 950 may be lowered into the paint tray holder 210 and may detachably couple to the paint tray holder 210. The paint tray holder 210 may comprise a plurality of side rails 212 coupled to the sides of the frame 202 and at least one (1) paint tray shelf 214 coupled to the front of the paint container platform 204 to support the paint tray 950 from beneath. A front rail 216 of the frame 202 may prevent the paint tray 950 from sliding forward. The sides of the frame 202 and/or the plurality of side rails 212 may prevent the paint tray 950 from sliding to either side. The paint container platform 204 may prevent the paint tray 950 from sliding to the rear.

In some embodiments, the front of the paint tray cart 200 may comprise a roller handle guide 218. The roller handle guide 218 may be two (2) or more upward projections of the front of the frame 202 which may be configured to prevent a handle of a paint roller or a brush from sliding laterally.

The first container holder 230 may be configured to hold the first paint container 900 in a pouring position 290 where the first paint container 900 is tilted onto a side of the first paint container 900. In the pouring position 290, the first paint may flow into the paint tray 950 through the paint conduit 260 that is coupled to the first paint container 900. The first paint may flow until the first paint in the paint tray 950 rises to the level of the bottom of the paint conduit 260, at which time the flow of the first paint may cease. In this way, the amount of the first paint held by the paint tray 950 may remain constant, even as the first paint is used from the paint tray 950. In some embodiments, the first container holder 230 may support the 5-gallon paint container.

The first container holder 230 may comprise one (1) or more paint container cradles 232, 234 and a paint container stop 236. The paint container cradles 232, 234 may be vertically-oriented armatures that may be coupled to the top of the paint container platform 204. The tops of each of the paint container cradles 232, 234 may form a concave arc to accept the side of the first paint container 900. The paint container cradles 232, 234 and the paint container stop 236 may be oriented such that the paint container cradles 232, 234 and the paint container stop 236 are parallel to each other. The paint container cradles 232, 234 may be aligned such that the first paint container 900 may rest in the paint container cradles 232, 234. The paint container cradles 232, 234 may be rotated within the horizontal plane of the top of the paint container platform 204 such that the paint container cradles 232, 234 may form oblique angles with both the rear and the sides of the frame 202. The orientation of the paint container cradles 232, 234 may position the bottom of the paint conduit 260 above the paint tray 950.

In a preferred embodiment, there may be two (2) paint container cradles 232, 234. A first paint container cradle 232, positioned closer to the rear of the paint container platform 204 than a second paint container cradle 234, may be taller than the second paint container cradle 234 such that the first paint container 900 is held at an orientation that positions the top of the first paint container 900 lower than the bottom of the first paint container 900, thus compelling the first paint to flow towards the paint conduit 260.

At least one (1) first aperture 233 is formed on the first paint container cradle 232. At least one (1) second aperture 235 is formed on the second paint container cradle 234. Each first aperture 233 and second aperture 235 is configured to receive a hook of a strap 920. Such a strap 920 can be a bungee strap with a hook located at opposing distal ends thereof. The strap 920 is particularly useful in adding additional restraint and securing at least a portion of the first paint container 900 on either or both the first paint container cradle 232 and second paint container cradle 234.

The paint container stop 236 may extend upward from the paint container platform 204 to a position that places the top of the paint container stop 236 in front of the top of the first paint container 900. The paint container stop 236 may prevent the first paint container 900 from sliding downwards within the paint container cradles 232, 234.

The second container holder 240 may be configured to hold the second paint container 910 in the upright position 292. As a non-limiting example, the second paint container 910 may be held in the second container holder 240 with the top of the second paint container 910 open such that the second paint may be accessible from within the second paint container 910 by dipping the brush into the second paint container 910. The second container holder 240 may comprise a second container holder aperture 242 located on the top of the paint container platform 204. The second paint container 910 may be supported at the bottom of the second paint container 910 by the frame 202 and may be supported around the sides of the second paint container 910 by the top of the paint container platform 204 at the second container holder aperture 242.

The paint tray 950 may be configured to hold the first paint such that the first paint may be accessible for use. The paint tray 950 may detach from the paint tray cart 200 by lifting the paint tray 950. The paint tray 950 may comprise a plurality of side walls 952, a bottom wall 956, and an inclined surface 954. The plurality of side walls 952 and the bottom wall 956 may form an open-top container for holding the first paint. The inclined surface 954 may be a ramp leading from the bottom wall 956 of the paint tray 950 to the top front of the paint tray 950. When properly seated within the paint tray holder 210, the paint tray 950 is strategically placed such that a paint roller may be dipped into the first paint at the deepest portion of the paint tray 950 and may then be rolled against the inclined surface 954 to remove excess paint. The bottom wall 956 may define the deepest portion of the paint tray 950.

The paint conduit 260 may convey the first paint from the first paint container 900 to the paint tray 950. The paint conduit 260 may couple to a lid 970 of the first paint container 900. The paint conduit 260 may comprise an extension tube 262 to convey the first paint from the first paint container 900 to a point over the paint tray 950, an elbow 264 to redirect the first paint downward into the paint tray 950, and a down tube 266 that extends downward into the paint tray 950, ostensibly when the paint tray 950 is properly seated in the paint tray holder 910. The bottom of the down tube 266 may be lower than the top of the paint tray 950. Airflow into the first paint container 900 through the paint conduit 260 may be blocked by the first paint in the paint tray 250 reaching the bottom of the down tube 266 and this blockage of the airflow may prevent more of the first paint from flowing into the paint tray 950 once the paint tray 950 is filled. In an embodiment, the paint conduit 260 further comprises a valve 263. The valve 263 enables selective transfer of the first paint from the first paint container 900 to the paint tray 950. The valve 263 is preferably a ball valve with a handle to provide selective metering of the transfer of the first paint, but can be any valve that accomplishes the same task. The valve 263 may be situated in-line with, and is in fluid communication with, the extension tube 262, the elbow, 264, and the down tube 266.

The first paint container 900 may be a 5-gallon commercial paint container as purchased with the first paint and the lid 970 may be a commercial paint container lid 902. In those instances, the paint conduit 260 may couple to the commercial paint container lid 902 via a commercial lid aperture 904 provided in the commercial paint container lid 902 or via a lid aperture 972 cut into the commercial paint container lid 902. In some embodiments, the invention 100 may comprise the lid 970 such that the paint conduit 260 may be coupled to the lid 970 at the lid aperture 972 and the lid 970 may replace the commercial paint container lid 902.

In some embodiments, the invention 100 may comprise a first included paint container 980 such that the first included paint container 980, the lid 970, and the paint conduit 260 fit together at airtight couplings. The first paint may be poured into the first included paint container 980 prior to use.

The second paint container 910 may be a 1-gallon commercial container as purchased with the second paint. In some embodiments, the invention 100 may comprise a second included paint container 982 which may be a reusable paint container that the second paint may be poured into prior to use, thus assuring that the second included paint container 982 fits into the second container holder 240.

In use, the paint conduit 260 may be coupled to the lid 970 of the first paint container 900 at the lid aperture 972 and the lid 970 may be placed tightly onto the first paint container 900. The paint tray 950 may be placed into the paint tray holder 210. The first paint container 900 may be turned to a pouring position 290 and placed onto the paint container cradles 232, 234 such that the paint conduit 260 directs the first paint into the paint tray 950. The first paint may fill the paint tray 950 until the first paint reaches the bottom of the paint conduit 260 and then the flow of the first paint may cease. Alternately, the first paint can be transferred by selectively metering the first paint through use of the valve 263. As the first paint is used and the level of the first paint drops, the first paint may flow again to refill the paint tray 950. The first paint may be applied to a paint roller from the paint tray 950 for painting.

The second paint container 910 may be opened and placed into the second container holder 240. The second paint may be accessible for painting by dipping a brush into the second paint container 910.

The first paint container 900 may be a 5-gallon commercial paint container or the first included paint container 980. The lid 970 may be the commercial paint container lid 902 or may be provided as part of the invention 100. The second paint container 910 may be a 1-gallon commercial container or the second included paint container 982.

The exact specifications, materials used, and method of use of the invention 100 may vary upon manufacturing. The foregoing descriptions of specific embodiments of the present invention have been presented for purposes of illustration and description. They are not intended to be exhaustive or to limit the invention to the precise forms disclosed, and obviously many modifications and variations are possible in light of the above teaching. The embodiments were chosen and described in order to best explain the principles of the invention and its practical application, to thereby enable others skilled in the art to best utilize the invention and various embodiments with various modifications as are suited to the particular use contemplated.

What is claimed is:

1. A Paint Handling Device, comprising:

a paint tray cart with a rectangular frame and a plurality of wheels, including at least two swivel wheels;

a paint tray holder integrated into the paint tray cart, featuring a depression matching a footprint of a detachable paint tray, a pair of side rails, and a paint tray shelf, a first container holder designed to hold a first paint container in a tilted pouring position, and comprising a one or more paint container cradles with a plurality of apertures for attaching an at least one securing strap, and a paint container stop;

a second container holder configured to hold a second paint container in an upright position;

a roller handle guide with a plurality of upward projections located at a front of the frame; and, wherein the paint tray comprises a plurality of side walls, a bottom wall, and an inclined surface for removal of excess paint from a paint roller.

2. The Paint Handling Device of claim 1, further comprising a paint conduit for transferring paint from the first paint container to the paint tray comprising:

an extension tube, an elbow, a down tube; and a valve for selective paint flow control; and, wherein the paint conduit is coupleable to a lid of the first paint container, which may be a commercial lid or a specially designed lid provided with the device.

3. The Paint Handling Device of claim 2, wherein the first paint container is selected from a commercial 5-gallon paint container or a specially provided paint container, and the second paint container is a commercial 1-gallon paint container or a specially provided paint container.

* * * * *